INVENTOR.
GEORGE L. GISONNO
BY Peter J. Gaylor
ATTORNEY

INVENTOR.
GEORGE L. GISONNO
BY
ATTORNEY

Aug. 22, 1967 G. L. GISONNO 3,337,866

VEHICLE ANTI-COLLISION APPARATUS

Filed Oct. 5, 1965 5 Sheets-Sheet 3

INVENTOR.
GEORGE L. GISONNO
BY Peter J. Gaylor
ATTORNEY

TRUTH TABLE

| DESCRIPTION OF TARGET | MINTERMS | INPUT X | Y | Z | | OUTPUT U (GAS) | V (BRAKE) | W (LIGHTS) |
|---|---|---|---|---|---|---|---|---|
| | 0 | 0 | 0 | 0 | | 0 | 0 | 0 |
| PEDESTRIAN 15 AT j | 1 | 0 | 0 | 1 | | 1 | 0 | 1 |
| PEDESTRIAN 15 AT k | 2 | 0 | 1 | 0 | | 1 | 0 | 1 |
| | 3 | 0 | 1 | 1 | | 0 | 0 | 0 |
| PEDESTRIAN 15 AT l | 4 | 1 | 0 | 0 | | 1 | 0 | 1 |
| | 5 | 1 | 0 | 1 | | 0 | 0 | 0 |
| | 6 | 1 | 1 | 0 | | 0 | 0 | 0 |
| VEHICLE 13 AT m | 7 | 1 | 1 | 1 | | 1 | 0 | 1 |

TRUTH TABLE FOR CROSSING VEHICLE

| MINTERMS | INPUT X | Y | Z | | OUTPUT U (GAS) | V (BRAKE) | W (LIGHTS) |
|---|---|---|---|---|---|---|---|
| 0 | 0 | 0 | 0 | a a | | | |
| 1 | 0 | 0 | 1 | b | | | |
| 2 | 0 | 1 | 0 | | | | |
| 3 | 0 | 1 | 1 | d | | | |
| 4 | 1 | 0 | 0 | c | | | |
| 5 | 1 | 0 | 1 | | | | |
| 6 | 1 | 1 | 0 | l | | | |
| 7 | 1 | 1 | 1 | a a | 1 | 0 | 1 |

INVENTOR.
GEORGE L. GISONNO
BY Peter J. Gaylor
ATTORNEY

TRUTH TABLE

| DESCRIPTION OF TARGET | MINTERMS | INPUT X | INPUT Y | INPUT Z | | GAS OUTPUT U | BRAKE OUTPUT V | LIGHTS OUTPUT W |
|---|---|---|---|---|---|---|---|---|
| | 0 | 0 | 0 | 0 | | 0 | 0 | 0 |
| PEDESTRIAN 15 AT j | 1 | 0 | 0 | 1 | | 1 | 1 | 1 |
| PEDESTRIAN 15 AT i | 2 | 0 | 1 | 0 | | 1 | 1 | 1 |
| | 3 | 0 | 1 | 1 | | 1 | 1 | 1 |
| PEDESTRIAN 15 AT i | 4 | 1 | 0 | 0 | | 1 | 1 | 1 |
| | 5 | 1 | 0 | 1 | | 1 | 1 | 1 |
| | 6 | 1 | 1 | 0 | | 1 | 1 | 1 |
| VEHICLE 13 AT m | 7 | 1 | 1 | 1 | | 1 | 1 | 1 |

TRUTH TABLE FOR CROSSING VEHICLE

| | MINTERMS | INPUT X | INPUT Y | INPUT Z | | GAS OUTPUT U | BRAKE OUTPUT V | LIGHTS OUTPUT W |
|---|---|---|---|---|---|---|---|---|
| a | 0 | 0 | 0 | 0 | a | | | |
| | 1 | 0 | 0 | 1 | b | | | |
| | 2 | 0 | 1 | 0 | | | | |
| | 3 | 0 | 1 | 1 | d | | | |
| c | 4 | 1 | 0 | 0 | | | | |
| | 5 | 1 | 0 | 1 | | | | |
| ℓ | 6 | 1 | 1 | 0 | | | | |
| a | 7 | 1 | 1 | 1 | a | 1 | 1 | 1 |

INVENTOR.
GEORGE L. GISONNO
BY Peter J. Gaylor
ATTORNEY

United States Patent Office 3,337,866

Patented Aug. 22, 1967

3,337,866

VEHICLE ANTI-COLLISION APPARATUS

George L. Gisonno, 510 Deal Lake Drive, Asbury Park, N.J. 07712

Filed Oct. 5, 1965, Ser. No. 493,157

4 Claims. (Cl. 343—7)

Figure 1:
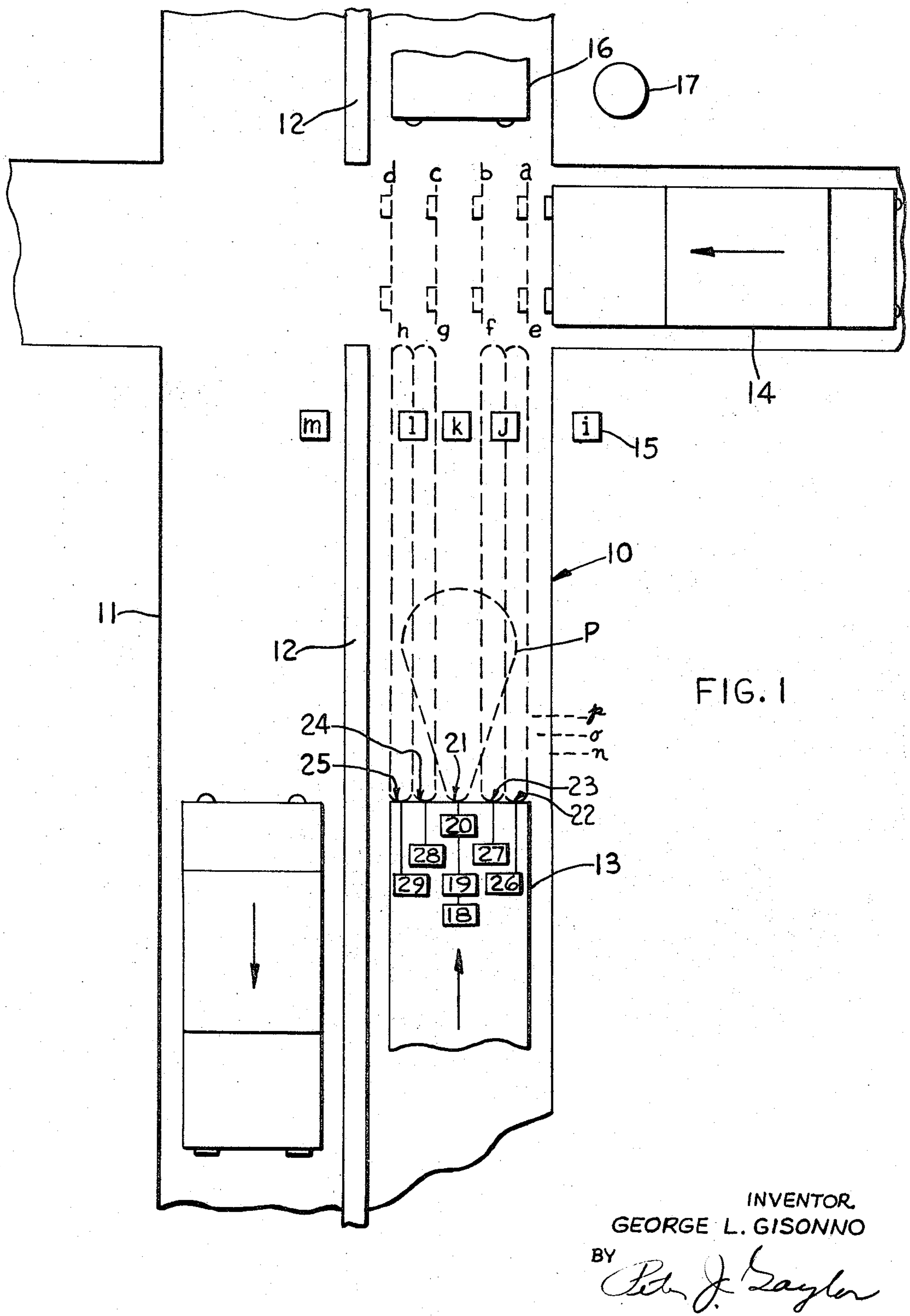

The invention described herein may be manufactured and used by or for the Government of the United States for governmental purposes, without payment of royalty thereon.

This invention relates to vehicle anti-collision apparatus and more particularly to improved apparatus adapted for automatic actuation of control members of a vehicle in response to encountered road hazards.

Various anti-collision devices have been proposed heretofore. In general, the prior devices are not adequate to meet all of the requirements of modern high speed transportation. Also, certain of the prior arrangements are of limited capability and reliability, while others are not automatic with respect to vehicle response.

Apparatus made in accordance with this invention overcomes the shortcomings of prior anti-collision devices and is effective for automatically controlling the movement of fast moving vehicles on land or water, thereby to prevent accidents and/or maintain safe driving distances, particularly under conditions of poor visibility. In a broad sense, the apparatus is constructed and arranged to provide, sequentially, binary digital data corresponding to various road hazards. Such data are compared with binary data stored in a memory device, thereby to produce command signals for operating appropriate power devices for the control of the vehicle's brakes, steering, velocity, etc.

An object of this invention is the provision of anti-collision apparatus of improved capability and reliability.

An additional object of this invention is the provision of apparatus for controlling the movement of land or water vehicles in correspondence with encountered road hazards, which apparatus is effective under conditions of poor visibility.

A further object of this invention is the provision of vehicle anti-collision apparatus constructed and arranged to provide sequential, binary digital data in correspondence with various road hazards for the purpose of effecting movement of a vehicle in accordance with a predetermined pattern.

A still further object of this invention is the provision of apparatus for control of vehicle movement in response to encountered road hazards, said apparatus comprising means to produce binary digital signals in correspondence with various road hazards, means for comparing these signals with stored binary signals of predetermined pattern, and means producing resulting command signals for operating power devices on the vehicle to control the movement thereof.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 3:
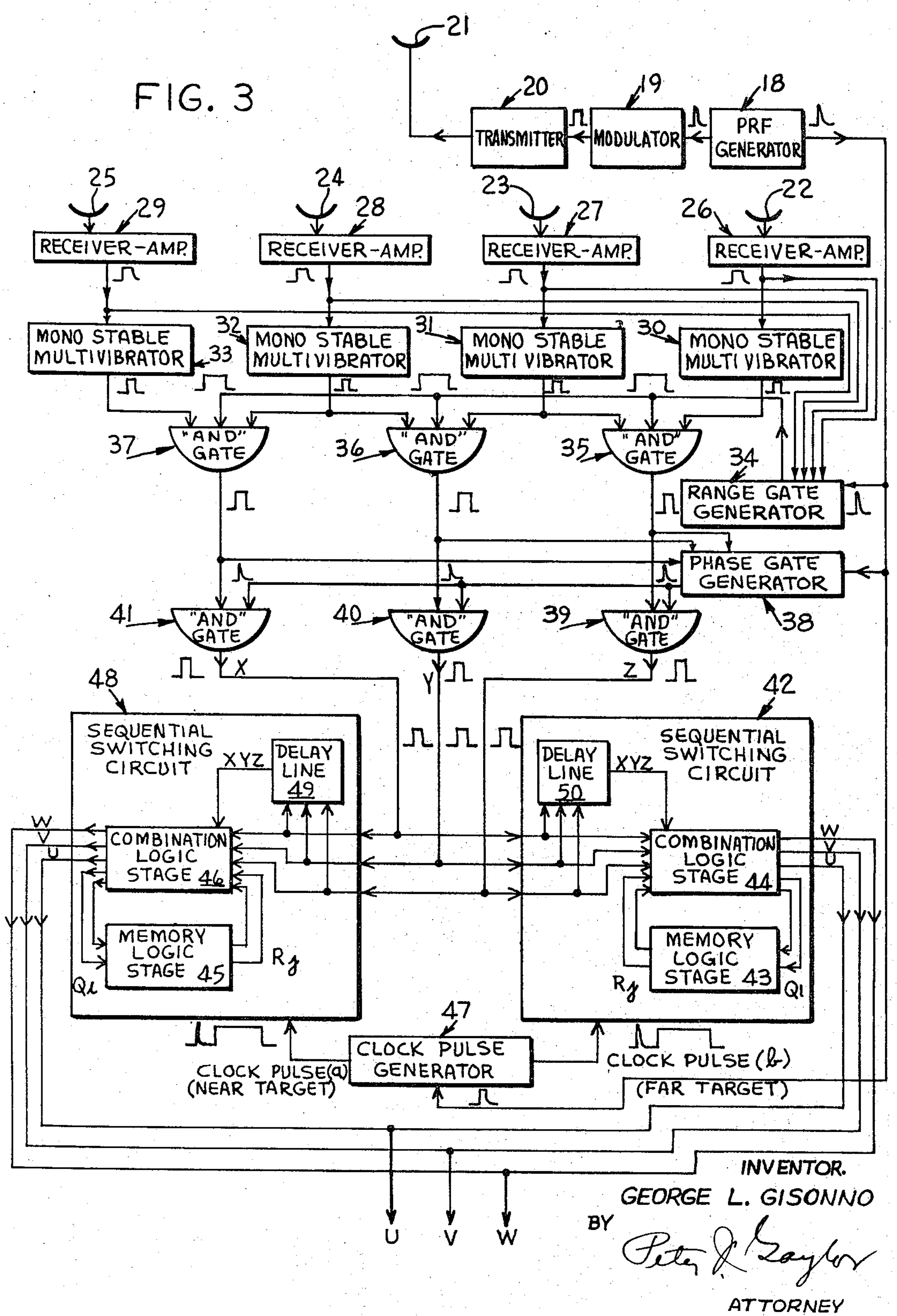

In the drawings wherein like reference characters denote like parts in the several views:

FIGURE 1 is a diagrammatic representation to illustrate the broad concept of the invention as applied to a vehicle moving along a road;

FIGURES 2A–D are graphs showing the phase relationships of signals received by the receiving antennae for various positions of a target;

FIGURE 3 is a block diagram showing the various electrical components which form apparatus made in accordance with this invention; and FIGURES 4A–5B are state diagrams of the sequential switching circuits under conditions assumed in the associated truth tables.

Reference now is made to FIGURE 1, wherein there is shown a road having a northbound lane 10 and a southbound lane 11, which lanes are separated by a divider identified by the numeral 12. The vehicle 13, shown in block form, is provided with apparatus made in accordance with this invention, as will be described hereinbelow. The numeral 14 identifies a vehicle moving on the cross road. As this vehicle moves across the lane 10, its front portion will occupy, at given instances, the positions defined by the broken lines (*a*), (*b*), (*c*) and (*d*). Similarly, as this vehicle progresses beyond the lane 10, its rear portion will occupy, at given instances, the positions defined by the same broken lines but identified by the letters (*e*), (*f*), (*g*) and (*h*). The numeral 15 identifies a pedestrian occupying an initial position (*i*). Assuming that the pedestrian crosses the lane 10 in front of the vehicle 13, his positions, at given instances, are indicated by the letters (*j*), (*k*), (*l*) and (*m*). The numeral 16 identifies a vehicle moving in the northbound lane 10 ahead of the vehicle 13, and the numeral 17 identifies a stationary object such as, say, a tree.

The vehicle 13 carries a high frequency, pulse transmitter 20, pulse modulated by a modulator 19 driven by the pulse repetition frequency generator 18, and a transmitting antenna 21, the latter producing an electromagnetic radiation pattern identified by the broken line P. Also carried by the vehicle 13 is a linear, in-phase receiving antenna array consisting of a plurality of antennas, such as the four antennas 22–25, spaced apart by a whole or fractional multiple of the wavelength of the signals transmitted by the antenna 21. Individual receivers 26–29 are connected to the receiving antennas 22–25, each receiver including a linear detector responsive to the return signals reflected by a target which may be positioned within the range of the pattern transmitted by the antenna 21. It may here be pointed out that, with respect to the vehicle 16, the parallel lines extending along the northbound lane 10 and from the individual antennas 22–25, define the areas within which return signal pulses will be received by each of these antennas, when the vehicle 16 is in the position shown in FIGURE 1. If two antennas are spaced apart a distance (S), then the relative phase angle $\phi$ of the signal of wavelength $\lambda$, as received by the two antennas, is given by the equation, $$\Delta\phi m = \frac{2\pi}{\lambda} s_m \sin\theta_m \tag{1}$$

where $m=1, 2, 3$, etc. Thus, the return signal pulses will be out of phase with each other depending upon the relative angular position of the target relative to the center of the receiving antenna array. Also, such return signal pulses will be displaced time-wise relative to the transmitted signal pulses by an amount depending upon the distance of the target from the vehicle 13. For example, when the target is the vehicle 14 progressing across the lane 10, the return signal pulses appear phase-wise as shown in FIGURES 2A–D, to which reference now also is made.

Figure 2A:
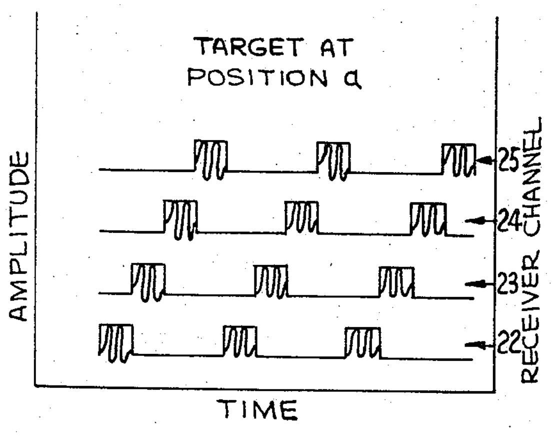
Figure 2B:
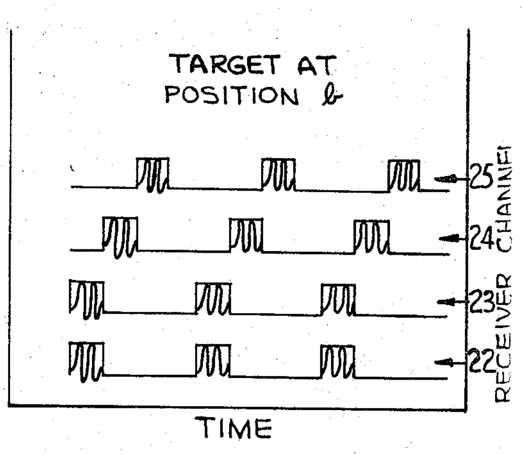
Figure 2C:
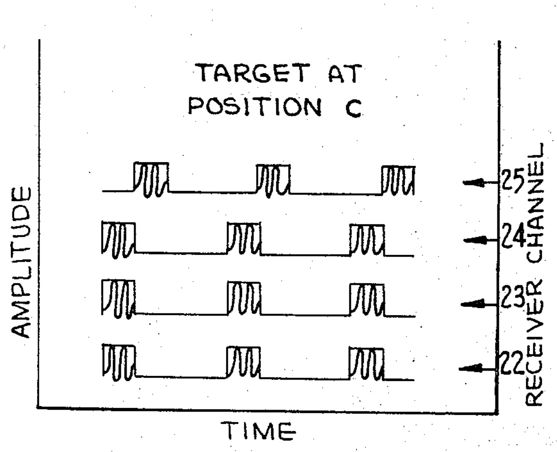
Figure 2D:
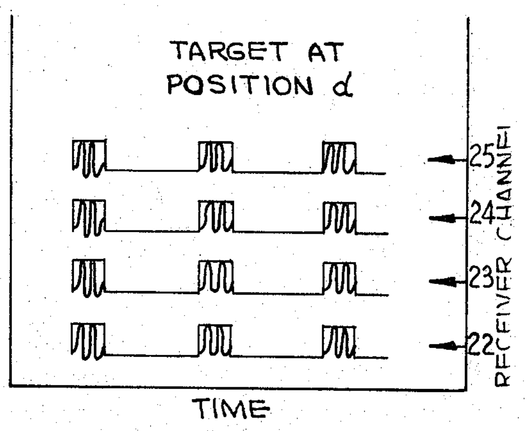

When the front of the vehicle 14 occupies the position (*a*), shown in FIGURE 1, the return pulses received by the individual receiving antennas 22–25 will have the phase relationships shown in FIGURE 2A. For purposes of description, the four receiver channels shown in FIGURE 2A are identified by the numerals of the individual receiving antenna, namely, 22–25. It will be noted that, in this position of the target, none of the return signal pulses are in phase. When the vehicle 14 reaches the position (*b*), see FIGURE 1, the return signal pulses in receiver channels 22 and 23 are in phase, as shown in FIGURE 2B, whereas, when the vehicle reaches position (*c*), the pulses in the three receiver channels 22, 23 and 24 are in phase, as shown in FIGURE 2C. Once the vehicle spans the northbound lane, that is, its front occupies the position (*d*) shown in FIGURE 1, the return signal pulses in all four receiver channels are in phase, as shown in FIGURE 2D. A similar change in the phase relationships of the return signal pulses occurs as the vehicle 14 moves beyond the road intersection so that the rear thereof progressively occupies the positions (*e*), (*f*), (*g*) and (*h*). It will be understood that the term "phase" used above refers to the relative phase angle of the radio frequency signal received by the antennas 22–25.

The four receiver channels are connected to combination logic circuits comprising various components for the purpose of producing binary digital data depending upon the position of the center of the target relative to the center of the receiving antenna array, as will now be described with reference to FIGUURE 3. The return pulses, or echoes, are received by the antennas 22–25 and detected and amplified in receivers 26–29 which may be either video receivers or superheterodyne receivers. The four video pulse outputs of the receivers 26–29 are fed to four monostable multivibrators 30–33, for the purpose of pulse shaping, and to a range gate generator 34 for the purpose of generating a range gate. Each of the multivibrators generate rectangular pulses of equal amplitude, which pulses have a fast rise time and very small width. Such rectangular pulses are of suitable waveform for driving the combination logic stages 35, 36 and 37. These logic stages, or "and gates," which determine when coincidence of two adjacent inputs is true or not true, require input pulses of equal amplitude with fast time rise and very small width, in order to achieve a high degree of azimuth precision in the decision of the "and gates." The range gate generator 34 generates a ramp voltage which is started by a trigger pulse from the pulse repetition frequency generator 18 each time the transmitter 20 is fired. This ramp voltage is terminated each time an echo signal is received and emitted by the receivers 26–29. A range gate is produced by the range gate generator 34 starting at the termination of the ramp voltage. Assuming equal delay in the four multivibrators 30–33, the leading edge of the range gate voltage, out of the range gate generator 34, will coincide with the leading edge of the earliest pulse out of the multivibrators. For example, if the target is a pedestrian 15 at position (*i*), in FIGURE 1, the earliest echo signal will appear in the multivibrator 30 and then in the multivibrators 31, 32, 33. Since the range gate is relatively very wide, the range gate and echoes from the multivibrators will always overlap no matter how far the target is off center of the vehicle 13. The outputs of the range gate generator and the multivibrators drive the first bank of "and gates" 35, 36, 37. This first bank of "and gates" determines when the target occurs within the range gate and occupies the azimuth position corresponding to the positions (*j*), (*k*), and (*l*) in FIGURE 1, in the case of the pedestrian 15.

The phase gate generator 38 generates a ramp voltage which is started by a trigger from the pulse frequency generator 18 each time the transmitter is fired and such ramp voltage is terminated each time an echo is received and transmitted by the first band of "and gates" 35, 36, 37. A phase gate is produced by the phase gate generator 38 starting at the termination of the ramp voltage and having a pulse width which is small relative to pulses out of the first bank of "and gates." The outputs of the phase gate generator 38 and the "and gates" 35–37 drive the second bank of "and gates" 39, 40, 41. The second bank of "and gates" determines when the target is at the exact center of each pair of adjacent antennas in the receiving antenna array. For example, if the target is the pedestrian 15, moved to position (*j*) as shown in FIGURE 1, the decision of "and gate" 39 will be positive (or 1), that is, emitting an output pulse, while the decision of the "and gates" 40 and 41 will be negative (or 0), that is, emitting no pulse out. Thus, for the case under consideration, the ouputs of the "and gates" 39, 40 and 41 may be expressed as a binary pulse output $$X, Y, Z=0, 0, 1$$

respectively.

If X, Y and Z are considered to be variables which can have only zero (0) or one (1) value at any time corresponding to target or no target, it will be clear that a binary pulse combination X, Y, Z will appear at the output of the "and gates" 39, 40 and 41, which combination will depend upon the position of the center of the target relative to the center of the receiving antenna array. For example, if the target is the vehicle 14 crossing the northbound lane, as shown in FIGURE 1, the binary pulse output X, Y, Z will vary, sequentially, or in a timewise manner, in accordance with the various positions of the vehicle. Such binary pulse combination is shown in the following tabulation, wherein the number (1) indicates pulse transmission and the number (0) indicates non-transmission from the "and gates" 39, 40 and 41.

TABLE 1

| Position of Vehicle 14 as Shown in FIG. 1 | Binary Pulse Output | | |
|---|---|---|---|
| | X | Y | Z |
| (*a*) | 0 | 0 | 0 |
| (*b*) | 0 | 0 | 1 |
| (*c*) | 0 | 1 | 1 |
| (*d*) (*e*) | 1 | 1 | 1 |
| (*f*) | 1 | 1 | 0 |
| (*g*) | 1 | 0 | 0 |
| (*h*) | 0 | 0 | 0 |

If the target is a pedestrian 15, crossing the northbound lane, the binary pulse output will vary sequentially, or in a time-wise manner, in accordance with the various positions of the pedestrian, as shown in the following tabulation:

TABLE 2

| Position of Pedestrian 15 as Shown in FIG. 1 | Binary Pulse Output | | |
|---|---|---|---|
| | X | Y | Z |
| (*i*) | 0 | 0 | 0 |
| (*j*) | 0 | 0 | 1 |
| (*k*) | 0 | 1 | 0 |
| (*l*) | 1 | 0 | 0 |
| (*m*) | 0 | 0 | 0 |

If, however, the target is a vehicle 16, stalled in the northbound lane, the binary pulse output will vary sequentially, or in a time-wise manner, in accordance with the various positions (*n*), (*o*), and (*p*) of the vehicle 13 (in FIGURE 1), as follows:

TABLE 3

| Position of Vehicle 13 as Shown in FIG. 1 | Binary Pulse Output | | |
|---|---|---|---|
| | X | Y | Z |
| (*n*) | 0 | 0 | 0 |
| (*o*) | 1 | 1 | 1 |
| (*p*) | 1 | 1 | 1 |

The binary pulse outputs corresponding to various targets produce sequential patterns of a singular type which, when processed by suitable sequential switching circuits, will provide automatic recognition and responses to the various road hazards.

With continued reference to FIGURE 3, the binary pulse outputs X, Y, Z are applied to synchronous sequential switching circuits identified by the numerals 42 and 48, which circuits comprise the respective combination stages 44, 46 and memory stages 43, 45. If X, Y and Z are considered to be independent input variables which can be either (1) for a target at positions (*l*), (*k*), (*j*) shown in FIGURE 1, or zero (0) for no target in these positions, and if ($R_1$), ($R_2$), ($R_j$) are considered to be input variables representing present internal states which can be either (1) or (0), (where *j* is 1, 2 . . . up to 2*p*), the memory logic stages 43 and 45 (consisting of binary elements such as flip-flops) allow the sequential switching circuits 42 and 48 to have different internal states (*s*) for different inputs X, Y, Z and $R_j$. The combination logic stages 44 and 46 (consisting of "and gates" and "or gates") allow the switching circuits 42 and 48 to switch as functions of the input variables X, Y, Z and $R_j$. If (*p*) memory elements (assumed binary) are used, the number of internal states $(S)=2p$ and the number of internal variables $(Q_1)$ and $(R_j)=4p$. If, now, U, V and W are considered to be dependent output variables which can be either (1) for a command voltage to a control unit or (0) for no command voltage to a control unit, and if ($Q_1$), ($Q_2$), ($Q_i$) are considered to be output variables representing the next internal state which can be either (1) or (0), the outputs U, V and W (of the synchronous switching circuits 42 and 48) are switched as functions of the present inputs X, Y, and Z and present internal states ($R_1$), ($R_2$), ($R_j$), or, expressed mathematically, $$U=f\ (X\ Y\ Z\ R_1\ R_2\ R_j)$$
$$V=g\ (X\ Y\ Z\ R_1\ R_2\ R_j)$$
$$W=h\ (X\ Y\ Z\ R_1\ R_2\ R_j)$$

where $j=1, 2, 3 \ldots 2p$.

The present inputs X, Y, Z and present internal states $R_j$ also determine what the next internal state will be, or, expressed mathematically, $$Q_i=k\ (X\ Y\ Z\ R_1\ R_2\ R_j) \qquad (3)$$

These relationships are shown by the flow lines tying together the various components within the blocks identified by the numerals 42 and 48, see FIGURE 3.

With continued reference to the blocks identified by the numerals 42 and 48, FIGURE 3, if all of the memory elements are gathered into boxes labeled memory logic stages 43 and 45, the remaining parts of the circuits 42 and 48 form purely combination logic stages 44 and 46 that have as inputs the present inputs X Y Z and present internal states $R_j$ and as outputs the present outputs U V W and next internal states $Q_i$. The distinguishing characteristic of the synchronous switching circuits 42 and 48 (as compared to non-synchronous switching circuits) is that the inputs X Y Z, outputs U V W, and the internal states $R_j$, $Q_i$ are sensed only at certain moments of "bit" time set by the clock pulses (*a*) and (*b*) generated by the clock pulse generator 47. Two sequential switching circuits are used in order to examine inputs X Y Z occurring at a near range requiring fast vehicle response and inputs X Y Z occurring at a far range requiring slow vehicle response. The clock pulse generator 47 is triggered by the pulse repetition generator 18 each time the transmitter 20 fires and generates a wide voltage pulse (*a*) or range gate, thereby opening the sequential switching circuit 48 to receive a pulse representing a target close to the vehicle, say 10 to 100 feet. Similarly the clock pulse generator generates a wide voltage pulse (*b*), or range gate, occurring late in time relative to the main bang after the opening of the sequential switching circuit 42, whereby the sequential switching circuit 42 is conditioned to receive a pulse representing a target far from the vehicle, say, 100 to 200 feet.

Since both of the present outputs U V W and next internal states $Q_i$, of the sequential switching circuits 42 and 48, are functions of the present inputs X Y Z and present internal states $R_j$, the behavior or operation of these switching circuits can be described by listing or tabulating all of the combinations of outputs U V W and next internal state $Q_1$ as functions of the inputs X Y Z and present internal states $R_j$. If there are (*n*) input variables and (*r*) internal state variables, such a tabulation would have $2^{n+r}$ rows at the most, not considering optimization. If there are (*m*) output variables, the tabulation would have $m+s$ columns at the most, also not considering optimization. Such tabulations constitute a complete description of the circuit and would be a formal solution permitting synthesis of functions and circuits by one skilled in the art of logical design. These tabulations can always be made if the internal structure of the system is fully known. However, if only the input terminal conditions of the system are available, as indicated by the above Tables 1, 2 and 3, it is not always possible to ascertain the details of the system's internal parts and behavior. However, in that case, a complete description of the input and output terminal conditions, together with the internal states for all possible input and output sequences, may also be regarded as a formal solution permitting synthesis of the functions and circuits by one versed in this art. Such a description is commonly called a state diagram for the sequencing switching circuits.

State diagrams describing the terminal behavior and operation of the sequential switching circuits 42 and 48 are shown in FIGURES 4A–5B, meeting the requirements of the input conditions X Y Z given by Tables 1, 2 and 3, above, and the output conditions U V W assumed in the Truth Tables adjoining the diagrams. It is here pointed out that in these figures the encircled letters denote the state of memory stages and the numerals adjacent the flow lines indicate binary inputs/outputs. As shown in FIGURE 3, the three input lines to the combination logic stages 44 and 46 are converted into one input line by the Delay lines identified by the numerals 49 and 50. The input X Y Z is fed serially and scanned for a (1) in a set of three pulses or for three (1's) in a set of three pulses. Whenever a (1) or three consecutive (1's) occur in a set of three input pulses, one of the sequential switching circuits 42 and 48 produce output command voltages for the actuation of appropriate control units of the vehicle. Such command voltages may be either D.C. or A.C. as the circuits 42 and 48 are active circuits which carry internal power sources. As will be apparent from FIGURES 4A and 5A, whenever a (1) or three consecutive (1's) occurs in a set of three input pulses, the output of the switching circuit 42, if the target is far, is a command voltage to the gas control unit and light control unit to slow down the vehicle and warn the driver while, if the target is near, the output of the switching circuit 48 is a command voltage to the gas control unit, brake control unit and a dual light control unit for a crash stop of the vehicle. For example, if in internal state ⓒ, the input X Y Z is 000, the output U V W is 000 while, if the input X Y Z is 001, the output U V W is 101 for the switching circuit 42 and 111 for the switching circuit 48.

Figure 4A:
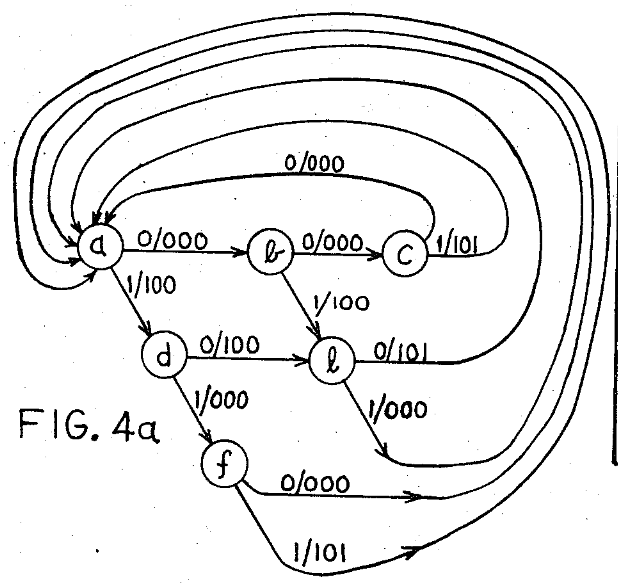
Figure 4B:
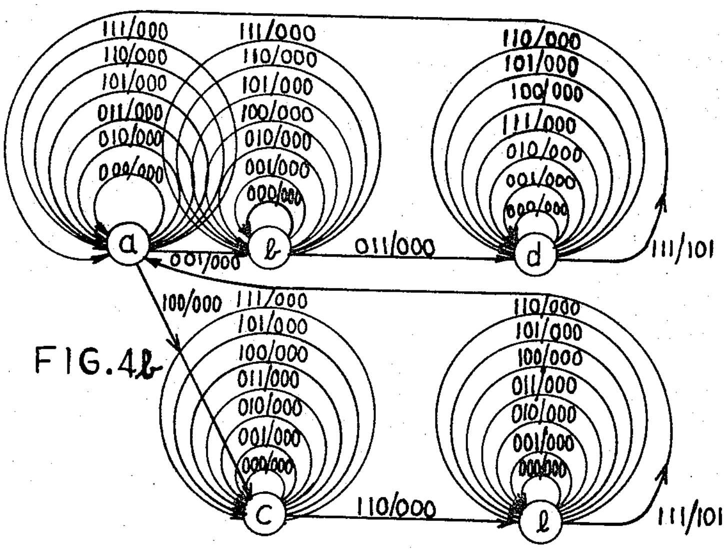
Figure 5A:
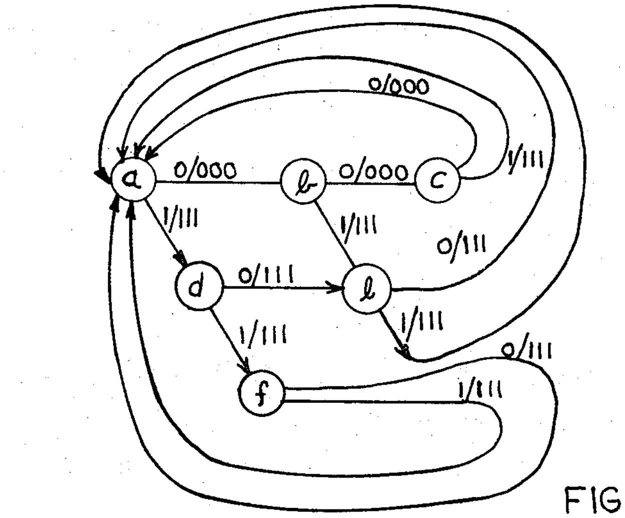
Figure 5B:
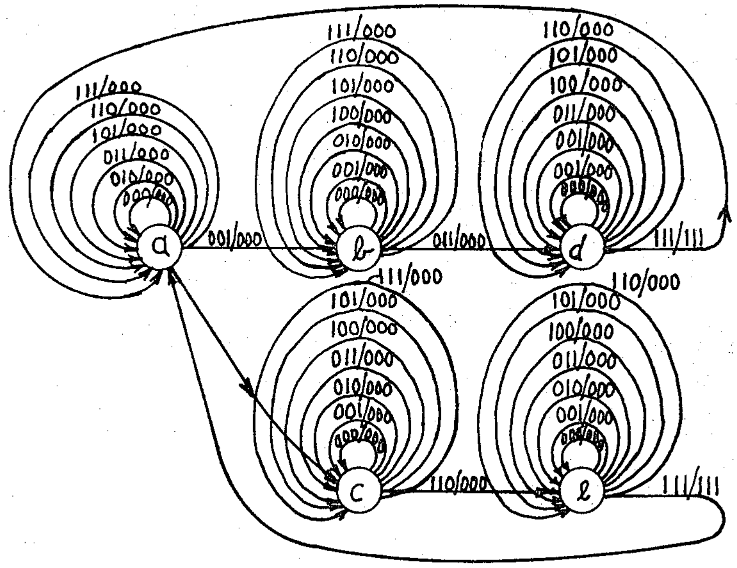

In accordance with FIGURES 4B and 5B, the input X Y Z is also fed in a 3-bit parallel manner and scanned for sequences 001, 011, 111 or 100, 110 or 111 in the parallel feed. Whenever the indicated sequence occurs, the output of the switching circuit 42, if the target is far, is a command voltage to the gas control unit and dual light control unit to slow down the vehicle and warn the driver while, if the target is near, the output of the switching circuit 48 is a command voltage to the gas control unit, brake control unit and the dual light control unit to effect a crash stop of the vehicle. For example, if, in internal state ⓓ or ⓔ, the input X Y Z is 111, then the output U V W is 101 for switching circuit 42 and 111 for switching circuit 48; otherwise for any other input X Y Z in state ⓓ or ⓔ (such as 001, 010), the output U V W is 000.

From the above description, it will be apparent that return signal pulses occurring at the same phase and range from a target, are examined for the program sequence. Appropriate signal outputs U, V and W will be switched whenever the sequential pattern corresponds to the road hazards programmed in the sequential switching circuits 42 and 48.

The concept and operation, described hereinabove, has been illustrated with surface vehicles traveling on highways. It will be apparent, however, that the invention also is adaptable for use on surface vehicles traveling on water or on tracks, in which case the output signals of the apparatus are modified, appropriately, to actuate the control members of such particular vehicles.

Having now described the invention, those skilled in this art will be able to make various changes and modifications, to adapt the apparatus to specific uses, without thereby departing from the spirit and scope of the invention as recited in the following claims.

I claim:

1. Anti-collision apparatus for a vehicle comprising, (a) transmitter means transmitting sets of high frequency electromagnetic pulses forwardly of the vehicle, (b) a linear in-phase parallel set of receiving antennas receiving a set of return electromagnetic pulses reflected by a target disposed within the range of the transmitted pulses, (c) converting means converting the sets of return pulses into corresponding sets of digital pulses, (d) a first set of "and gates" individually receiving the digital pulses of each set, (e) a range gate generator applying a range gate voltage to the said first set of "and gates," the leading edge of said voltage coinciding with the leading edge of the earliest pulse of each set of received pulses, (f) a second set of "and gates" individually receiving the digital pulses passed by the said first set of "and gates,"

(g) a phase gate generator applying a phase gate voltage to said second set of "and gates" upon the start of the first pulse of each set of received pulses, said voltage terminating when a pulse is passed by the first set of "and gates," and (h) gating means providing output command signals when a set of pulses passed by the second set of "and gates" has a predetermined sequential pattern.

2. The invention as recited in claim 1, wherein the said transmitter means comprises a transmitting antenna centrally disposed with respect to the said receiving antennas, a radio frequency transmitter having an output circuit connected to the transmitting antenna and an input circuit, a pulse modulator connected to the input circuit of the said transmitter, and a pulse repetition generator driving the said modulator; and wherein the said converting means comprises amplifiers individually connected to the receiving antennas and mono-stable multivibrators individually connected to said amplifiers, each multivibrator producing a rectangular wave output pulse when triggered by the associated amplifier.

3. The invention as recited in claim 2, wherein the rectangular wave output pulses produced by each multivibrator have a fast rise time and very small width; wherein the range gate voltage applied to the first set of "and gates" exceeds the time duration of a set of received pulses; and wherein the said phase gate voltage applied to the second set of "and gates" has a short time duration relative to that of the pulses passd by the first set of "and gates."

4. The invention as recited in claim 2, wherein the said gating means are a pair of digital computers having (a) means for serial and parallel feed of the pulses passed by the second "and gates," (b) digital logic stages generating output command signals and next internal states as functions of the pulses passed by the second "and gates" and present internal states, (c) digital memory means for generating present internal states and for storing next internal states; all inputs and outputs of the said logic and memory states being measured at bit times determined by a clock pulse generator which is triggered by the said pulse repetition generator once each time the said transmitter fires, the bit time in one computer being earlier than the bit time in the other computer in order to generate different output command signals for a given sequence of pulses passed by the said second "and gates."

References Cited

UNITED STATES PATENTS 3,025,514 3/1962 Alexander et al.

RODNEY D. BENNETT, *Primary Examiner.*

CHESTER L. JUSTUS, *Examiner.*

T. H. TUBBESING, *Assistant Examiner.*